US010751788B2

(12) United States Patent
Reitzig

(10) Patent No.: US 10,751,788 B2
(45) Date of Patent: Aug. 25, 2020

(54) METHOD AND JOINING ELEMENT FOR JOINING AT LEAST TWO COMPONENTS BY MEANS OF A FLOW-FORMED RIVET SLEEVE

(71) Applicant: WS Wieländer + Schill Professionelle Karosserie-Spezialwerkzeuge GmbH & Co. KG, Tuningen (DE)

(72) Inventor: Klaus Reitzig, Schalksmühle (DE)

(73) Assignee: WS Wieländer + Schill Professionelle Karosserie-Spezialwerkzeuge GmbH & Co. KG, Tuningen (DE)

( * ) Notice: Subject to any disclaimer, the term of this patent is extended or adjusted under 35 U.S.C. 154(b) by 69 days.

(21) Appl. No.: 15/578,645

(22) PCT Filed: Jun. 3, 2015

(86) PCT No.: PCT/EP2015/001134
§ 371 (c)(1),
(2) Date: Nov. 30, 2017

(87) PCT Pub. No.: WO2016/192742
PCT Pub. Date: Dec. 8, 2016

(65) Prior Publication Data
US 2018/0169741 A1 Jun. 21, 2018

(51) Int. Cl.
*F16B 19/10* (2006.01)
*B21J 15/04* (2006.01)
(Continued)

(52) U.S. Cl.
CPC .......... *B21J 15/045* (2013.01); *B21J 15/043* (2013.01); *F16B 5/04* (2013.01); *F16B 19/1054* (2013.01); *B62D 27/02* (2013.01)

(58) Field of Classification Search
CPC .............. B21J 15/045; Y10T 29/49908; Y10T 29/49826; Y10T 29/49938; Y10T 29/53487; Y10T 29/53496
See application file for complete search history.

(56) References Cited

U.S. PATENT DOCUMENTS 2,030,166 A    2/1936  Huck
2,146,461 A *  2/1939  Bettington ............. B21J 15/043
                                                            29/512
(Continued)

FOREIGN PATENT DOCUMENTS

CN      1575393 A       2/2005
CN    101981330 A       2/2011
(Continued)

OTHER PUBLICATIONS

PCT/EP2015/001134, International Search Report dated Jan. 28, 2016 (Three (3) pages).
(Continued)

*Primary Examiner* — Jason L Vaughan
*Assistant Examiner* — Amanda Kreiling
(74) *Attorney, Agent, or Firm* — Smartpat PLC

(57) ABSTRACT

A method for joining at least two components, in particular two sheet components of a vehicle body, by a flow-formed rivet sleeve is disclosed. The flow-formed rivet sleeve includes a cladding region, a first edge region, and a second edge region. A traction shaft including a base body and a head is introduced in the flow-formed rivet sleeve and the flow-formed rivet sleeve is inserted into respective through openings of the components. By a relative movement of the traction shaft to the flow-formed rivet sleeve, the flow-formed rivet sleeve is widened in the first edge region and is brought into contact with one of the components. The second edge region is bent towards the other component by
(Continued)

a reshaping tool surrounding the traction shaft and is brought into contact with the other component.

9 Claims, 14 Drawing Sheets

(51) Int. Cl.
 *F16B 5/04* (2006.01)
 *B62D 27/02* (2006.01)

(56) References Cited

U.S. PATENT DOCUMENTS

| | | | |
|---|---|---|---|
| 2,803,984 | A | 8/1957 | Swenson |
| 3,149,530 | A | 9/1964 | Kolec |
| 4,137,817 | A | 2/1979 | Siebol |
| 4,407,619 | A * | 10/1983 | Siebol .................. H05K 5/02 411/43 |
| 4,447,944 | A | 5/1984 | Mohrman |
| 4,627,775 | A | 12/1986 | Dixon |
| 5,346,348 | A | 9/1994 | Denham |
| 5,581,867 | A | 12/1996 | Gaquere |
| 6,004,086 | A | 12/1999 | Gand et al. |
| 6,389,676 | B1 * | 5/2002 | Denham .............. F16B 19/1054 227/51 |
| 7,150,593 | B2 | 12/2006 | Roberts |
| 7,263,753 | B2 | 9/2007 | El Dessouky |
| 8,029,220 | B2 | 10/2011 | David et al. |
| 2006/0248705 | A1 * | 11/2006 | Opper .................. B21J 15/025 29/525.06 |

FOREIGN PATENT DOCUMENTS

| | | |
|---|---|---|
| CN | 102187104 A | 9/2011 |
| DE | 691 05 949 T2 | 7/1995 |
| DE | 297 16 899 U1 | 1/1998 |
| DE | 10 2006 019 156 A1 | 10/2007 |
| DE | 10 2007 058 393 A1 | 6/2009 |
| DE | 10 2013 214 331 A1 | 1/2015 |
| EP | 0 903 507 A1 | 3/1999 |
| EP | 1 479 924 A1 | 11/2004 |
| EP | 2 436 935 A1 | 4/2012 |
| GB | 1029654 A | 5/1966 |
| GB | 2 163 823 A | 3/1986 |
| GB | 2 330 390 A | 4/1999 |
| JP | 40-331 B | 1/1965 |
| JP | 5-87112 A | 4/1993 |
| JP | 11-153114 A | 6/1999 |
| JP | 2001-519242 A | 10/2001 |
| JP | 2006-7323 A | 1/2006 |
| WO | WO 86/04965 A1 | 8/1986 |
| WO | WO 91/11625 A1 | 8/1991 |
| WO | WO 99/19097 A1 | 4/1999 |
| WO | WO 2010/046671 A1 | 4/2010 |

OTHER PUBLICATIONS

Chinese Office Action issued in Chinese counterpart application No. 201580080600.6 dated Oct. 18, 2018, with partial English translation (Twelve (12) pages).

Japanese Office Action issued in Japanese counterpart application No. 2017-562667 dated Jan. 8, 2019, with partial English translation (Eight (8) pages).

Chinese Office Action issued in Chinese counterpart application No. 201580080600.6 dated Jun. 18, 2019, with partial English translation (Eleven (11) pages).

* cited by examiner

METHOD AND JOINING ELEMENT FOR JOINING AT LEAST TWO COMPONENTS BY MEANS OF A FLOW-FORMED RIVET SLEEVE

BACKGROUND AND SUMMARY OF THE INVENTION

The invention relates to a method for joining at least two components, in particular two sheet components of a vehicle body, and a joining element for joining at least two components, in particular two sheet components of a vehicle body.

Such a method and such a joining element can already be gleaned as known from DE 10 2007 058 393 A1. With the method found there for joining at least two components, a rivet sleeve arranged in an aperture of the components, in particular a blind rivet, is deformed by driving a joining mandrel into an opening of the rivet sleeve, at least in sections, in such a way that a form-fit rivet connection of the two components is generated. In order to be able to also generate a high-strength rivet connection, it is provided in the method found there that the joining mandrel inserted into the opening of the rivet sleeve performs a rotation movement causing a relative movement between the joining mandrel and the rivet sleeve.

Such joining methods enable the joining of respective components, even when it is only possible to access one side of only one of the components, wherein the other component is covered. The components joined by means of such a method or such blind rivets are connected to each other in a high-strength manner after the joining process, however, depending on the method, the fixed rivets require a large construction space because they usually have a stable flange that is applied particularly thickly or a placing and closing head by means of which they are applied to at least one of the components. The flange therefore has an increased need for space since it must be stable enough to withstand the reshaping forces.

The object of the present invention is thus to create a method and a joining element of the kind mentioned at the start by means of which respective components can be joined in a high-strength manner with a particularly minimal need for space.

A first aspect of the invention relates to a method for joining at least two components, in particular two sheet components of a car body, by means of a flow-formed rivet sleeve comprising a cladding region, a first edge region and a second edge region, into which flow-formed rivet sleeve a traction shaft comprising a base body and a head can be inserted. Furthermore, the flow-formed rivet sleeve is pushed into respective through openings of the components that at least substantially align with one another, after which the flow-formed rivet sleeve expands in the first edge region as a result of a relative movement of the traction shaft to the flow-formed rivet sleeve and is brought into contact with one of the components.

In order to now be able to join the components in a high-strength manner and in a way that requires particularly minimal space, it is provided according to the invention that the second edge region is bent towards the other component by means of a reshaping tool surrounding the traction shaft, the reshaping tool also being known as a setting tool, and is brought into contact with the other component.

Consequently, in addition to the first edge region, which is expanded in the method, the second edge region of the flow-formed rivet sleeve is thus also plastically deformed and applied to the other component. Unlike what is known from the prior art, the flow-formed rivet sleeve thus does not have a comparatively solid flange or setting and closing head, which is usually dimensioned in such a way that it withstands the reshaping forces during a conventional joining process, but instead, two opposing sides, i.e., the two edge regions of the flow-formed rivet sleeve, are deformed during the method. In this method, a force that deforms the flow-formed rivet sleeve is introduced into the flow-formed rivet sleeve in such a way that the first edge region expands, and the second edge region, which, as previously mentioned, is opposite the first edge region, bends towards the other component. By deforming the two edge regions, it is thus not necessary, in contrast to prior art, for one of the edge regions to withstand the force introduction by the reshaping tool and only the second edge region to be deformed.

By expanding and reshaping the first edge region, a so-called setting head, for example, is formed from the first edge region or the first edge region is reshaped into a so-called setting head. By reshaping the second edge region or the bending thereof towards the other component, a so-called closing head is formed from the second edge region or the second edge region is reshaped into a so-called closing head. The closing head formed by the method according to the invention is arranged opposite the setting head and, like the setting head, is a component of the flow-formed rivet sleeve that constitutes a rivet that is inserted, for example when joining a vehicle body, i.e., when joining sheets of a vehicle roof. The closing head formed by this method has a construction height of a maximum of 1 millimeter, for example, whereas a rivet connection produced according to a conventional method would have rivets having a respective construction height of the setting head of up to 3 millimeters. Furthermore, it is possible by means of the method according to the invention to design the setting head to have a construction height of 2.5 millimeters, for example, while in conventional methods, the closing head would have 8 millimeters. Thus, the space needed for construction of the reshaped flow-formed rivet sleeve can be kept particularly minimal.

By reshaping both the first edge region and the second edge region, construction space is saved, in particular, since the construction height of both the setting head and the closing head can be significantly reduced in comparison to methods already known.

In one advantageous embodiment of the invention, the base body of the traction shaft has at least one form-fit element via which the reshaping tool, by means of which the relative movement of the traction shaft to the flow-formed rivet sleeve is caused, interacts in a form-fit manner with the traction shaft at least when causing the relative movement. As a result, in the method according to the invention, a particularly advantageous transfer of forces, in particular traction forces, can take place from the reshaping tool to the traction shaft, in particular the base body. The reshaping tool is also called the setting tool, since it is used to move the traction shaft relative to the flow-formed rivet sleeve, in particular to move it in a translational manner in order to thus reshape the flow-formed rivet sleeve, in particular to expand the first edge region. This movement of the traction shaft and the reshaping of the flow-formed rivet sleeve, as well as the joining of the components caused by this is also known as setting the flow-formed rivet sleeve. The advantageous transfer of forces, in particular from the reshaping tool to the traction shaft, takes place via the at least one form-fit element of the base body, such that the reshaping tool engages with the base body and thus the traction shaft as a whole in a form-fit manner via the form-fit element of the base body, at least when moving the traction shaft. As a result of this form-fit engagement, traction forces, for example, can be transferred from the reshaping tool to the traction shaft, such that the traction shaft is moved in a translational manner by means of the reshaping tool in such a way that the head of the traction shaft, which, for example, initially protrudes from the flow-formed rivet sleeve, is moved, in particular drawn, at least partially into the flow-formed rivet sleeve, whereby the flow-formed rivet sleeve is reshaped, in particular the first edge region expands.

As a result of the form-fit engagement of the reshaping tool with the traction shaft, particularly high traction forces can also be transferred, such that the flow-formed rivet sleeve can be particularly advantageously reshaped by means of the traction shaft, in particular by means of the head. As a result, the components can be fixedly connected to one another. Furthermore, as a result of the form-fit engagement, unwanted relative movements between the traction shaft and the reshaping tool can be avoided, such that the traction shaft can be moved and positioned in a defined and targeted manner. Thus, a particularly strong connection of the components can be ensured. In particular, it is possible to position the head at least partially in the flow-formed rivet sleeve in a targeted and defined manner, such that the head remains in the flow-formed rivet sleeve, for example after joining the components.

In order to achieve the form-fit engagement, the reshaping tool has, for example, at least one further form-fit element that corresponds to the form-fit element of the base body, the form-fit element engaging with the at least one first form-fit element of the base body in a form-fit manner at least when causing the relative movement between the traction shaft and the flow-formed rivet sleeve.

In order to particularly fixedly connect the components to one another and thus at the same time keep the construction space required particularly low, it is provided in one advantageous embodiment of the invention that the head of the traction shaft has at least one recess which receives material which is displaced during joining. In other words, joining the components results in material displacement. This means that material at least of one of the components and/or material of the flow-formed rivet sleeve is displaced by joining. The displaced material can now flow into the recess of the head. The head, for example, thereby engages with the material which flows into the recess or is displaced in a form-fit manner, such that the head, which remains on the flow-formed rivet sleeve, in particular in the flow-formed rivet sleeve, and on the components after joining, for example, is prevented from detaching. In other words, the danger that the head detaches from the flow-formed rivet sleeve and the components can be kept particularly minimal as a result of displaced material flowing into the recess of the head.

A further embodiment is characterized in that respective diameters, in particular external diameters, of the edge regions are increased during the relative movement. As a result, in particular the construction space required in the axial direction of the flow-formed rivet sleeve or the traction shaft can be kept minimal.

It has been shown to be particularly advantageous when the traction shaft, in its axial direction, comprises a predetermined breaking point between the head and the base body. When joining, the base body is removed from the head in a targeted manner at the predetermined breaking point by the base body pulling off and/breaking off and/or breaking down in a different manner, for example, specifically at the pre-determined breaking point. The head of the traction shaft at least partially moved into the flow-formed rivet sleeve by the relative movement between the traction shaft and the flow-formed rivet sleeve and thus at least partially received in the flow-formed rivet sleeve thus remains on the flow-formed rivet sleeve and the components and can be prevented from detaching, for example by means of the material that flowed into the recess. The base body, however, is separated from the head specifically at the predetermined breaking point and thus removed from the head, the flow-formed rivet sleeve and the components, such that the required construction space and the weight of the connection produced can be kept particularly minimal.

The predetermined breaking point is formed, for example, by a local weakening, wherein the traction shaft at the predetermined breaking point, for example, has a smaller thickness, in particular wall thickness, than the regions of the traction shaft connected thereto, wherein these regions connect, for example in the axial direction, to the predetermined breaking point on both sides.

The previously mentioned axial direction of the flow-formed rivet sleeve and the traction shaft coincide, for example, with the direction in which the traction shaft is moved relative to the flow-formed rivet sleeve by means of the reshaping tool.

Finally, it has been shown to be advantageous for achieving a particularly strong connection of the components when the cladding region is formed as a cone or conically and, as a result of the relative movement, is deformed into a cylinder or cylindrically.

A second aspect of the invention relates to a joining element for joining at least two components, in particular two sheet components of a vehicle body. The joining element comprises a flow-formed rivet sleeve, which has a cladding region, a first edge region and a second edge region. Furthermore, the joining element comprises a traction shaft that is inserted into the flow-formed rivet sleeve and thus received at least partially in the flow-formed rivet sleeve and comprises a base body and a head. Here, the flow-formed rivet sleeve can be pushed into respective through openings of the components that at least substantially align with one another, after which the flow-formed rivet sleeve can expand in the first edge region as a result of a relative movement of the traction shaft to the flow-formed rivet sleeve and can be applied to one of the components.

In order to now be able to connect the components to one another in a high-strength manner with minimal required space, it is provided according to the invention that the second edge region can be bent towards the other component by means of a reshaping tool surrounding the traction shaft and can be applied to the other component. Advantageous embodiments of the first aspect of the invention are to be regarded as advantageous embodiments of the second aspect of the invention and vice versa. This means that the joining element according to the invention is designed to carry out the method according to the invention. The flow-formed rivet sleeve and the traction shaft thus form the joining element, which is used for joining or connecting the components in a high-strength and space-saving manner.

In one advantageous embodiment of the invention, the base body of the traction shaft has at least one form-fit element via which the reshaping tool, by means of which the relative movement of the traction shaft to the flow-formed rivet sleeve can be caused, can be brought into form-fit engagement with the traction shall at least when causing the relative movement. As a result, particularly high forces, in particular traction forces, can be transferred from the reshaping tool to the traction shaft.

In order to connect the components to one another in a strong and space-saving manner, it is provided in one advantageous embodiment of the invention that the head of the traction shaft has at least one recess for receiving material which is displaced during joining. This displaced material can be material at least of one of the components and/or material of the flow-formed rivet sleeve, wherein the displaced material can flow into the recess. As a result, it is also possible to prevent detachment of the head that remains, for example, on the flow-formed rivet sleeve and the components, i.e., an unwanted detachment of the head from the flow-formed rivet sleeve and the components, such that the head, which is separated from the base body, for example when joining, remains securely in the flow-formed rivet sleeve.

Here, it has been shown to be particularly advantageous when the recess completely circulates in the peripheral direction of the head. This should be understood to mean that the recess extends completely, i.e., without breaking, in the peripheral direction of the head, such that the recess is formed, for example, to be at least substantially circular or as a closed circle. The recess that is, for example, at least substantially groove-shaped or groove-like can thus receive a particularly large amount of displaced material, such that the head can be secured in a particularly strong manner on the flow-formed rivet sleeve or the components.

In a particularly advantageous embodiment of the invention, the form-fit element is formed as a receiver, in which at least one further corresponding form-fit element of the reshaping tool can be received at least partially. The further form-fit element can be moved, for example, in a support system having the wall regions that at least partially border the receiver of the base body, such that, as a result, the reshaping tool and the base body or the traction shaft as a whole can engage in a form-fit manner. Particularly high traction forces can be transferred as a result. Since in this embodiment, the form-fit element is formed as a receiver and not as a projection, for example, the reshaping tool can be fitted on the base body or pulled over this in a particularly simple manner. Furthermore, it is thus possible to keep the costs, weight and the required space of the joining element low.

To achieve a particularly advantageous form-fit engagement between the reshaping tool and the traction shaft, it is provided in a further embodiment of the invention that the receiver extends completely continuously in the peripheral direction of the base body. This means that the receiver runs completely in the peripheral direction of the base body, i.e., without breaking around the base body, such that the receiver is formed, for example, to be at least substantially circular or as a closed circle. As a result, the reshaping tool, for example, can engage with the base body particularly over a large area, such that even particularly high traction forces can be transferred. Furthermore, the reshaping tool can be placed on the base body in a particular simple, time- and cost-effective manner, such that the components can be connected to one another in a particularly simple manner.

Finally, it has been shown to be advantageous when the traction shaft, in particular in its axial direction, comprises a predetermined breaking point between the head and the base body. When joining, the traction shaft breaks off specifically at the predetermined break point in a controlled manner, such that the base body is separated from the head specifically at the predetermined break point in a controlled manner, in particular pulled off or broken off from the head. As a result, the head can remain on the flow-formed rivet sleeve and the components, wherein the base body can be removed from the head, the flow-formed rivet sleeve and the components and disposed of, for example. The weight and the required construction space of the connection can thereby be kept low. Furthermore, it is possible to avoid an uncontrolled breaking off of the base body from the head by using the predetermined breaking point, such that the head received at least partially in the flow-formed rivet sleeve or the rest of the traction shaft remaining on the flow-formed rivet sleeve does not protrude on the sides of the other component or does not at least excessively protrude from the flow-formed rivet sleeve.

Further advantages, features and details of the invention arise from the description of a preferred exemplary embodiment below, as well as with the aid of the figures.

BRIEF DESCRIPTION OF THE DRAWINGS

FIG. 2c shows sectionally, an enlarged schematic view of a region A from FIG. 2a;

FIG. 3c is a schematic detailed view of a region B shown in FIG. 3a;

FIG. 4c is a schematic detailed view of a region B shown in FIG. 4a;

FIG. 5c is a schematic detailed view of a region B shown in FIG. 5a;

FIG. 6c is a schematic detailed view of a region B shown in FIG. 6a;

DETAILED DESCRIPTION OF THE DRAWINGS

Figure 1A:
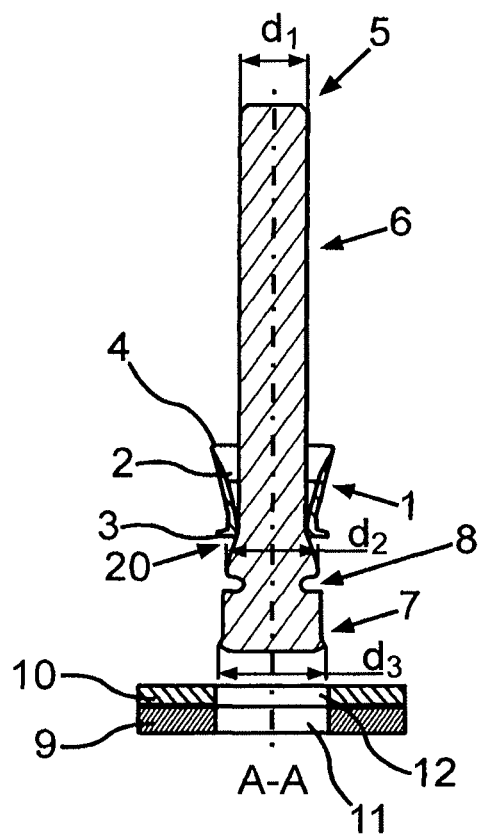
FIG. 1a is a schematic sectional view of a flow-formed rivet sleeve along a sectional line A-A shown in FIG. 1b, wherein a traction shaft has been inserted into the flow-formed rivet sleeve according to a first embodiment, such that the traction shaft is received at least partially in the flow-formed rivet sleeve.

In the figures, the same or functionally identical elements are provided with the same reference numerals.

Figure 1B:
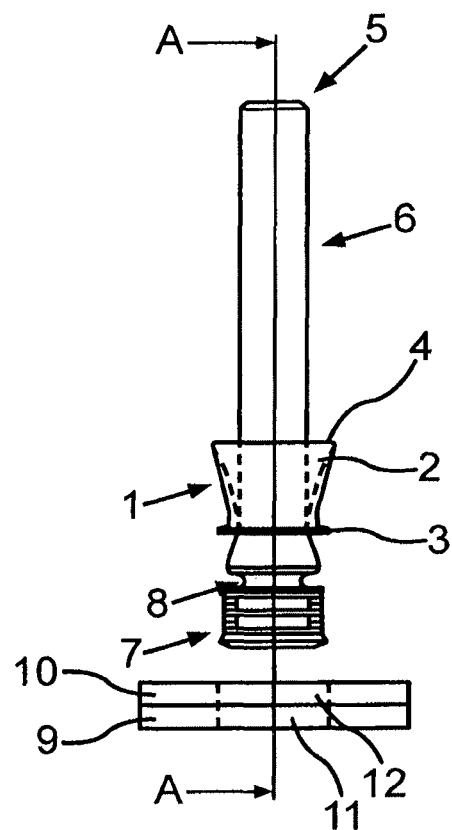
FIG. 1b is a schematic side view of the flow-formed rivet sleeve and the traction shaft inserted into the flow-formed rivet sleeve.

In FIG. 1a, a sectional view corresponding to a sectional line A-A depicted in FIG. 1b is shown, wherein a flow-formed rivet sleeve 1, which has a conical cladding region 2 and a first edge region 3 and a second edge region 4, is received by a traction shaft 5. The flow-formed rivet sleeve 1 and the traction shaft 5 are components of a joining element or form a joining element, which is illustrated in FIGS. 1a to 6c according to a first embodiment and in FIGS. 7 to 15 according to a second embodiment. The traction shaft 5 has a base body 6 across wide regions of its longitudinal extension, the base body 6 being formed at least substantially from a cylindrical full body having a diameter $d_1$, wherein this base body 6 proceeds at one end of the cylinder in a conical shape with a diameter $d_2$. A predetermined breaking point 8 is attached to the region having the conical shape (diameter $d_2$), the predetermined breaking point 8 bordering the base body 6 by means of a constriction by the head 7 of the traction shaft 5 which is typical for predetermined breaking points. In other words, the predetermined breaking point 8 is arranged in the axial direction of the traction shaft 5 between the base body 6 and the head 7, wherein the axial direction of the traction shaft 5 coincides with the axial direction of the flow-formed rivet sleeve 1 and with the longitudinal extension of the traction shaft 5. The head 7 has a significantly shorter longitudinal extension than the base body 6 and is also formed to be extensively cylindrical. On one end of the head 7 that is attached to the predetermined breaking point 8, in particular in the axial direction, the head 7 has a diameter which corresponds substantially to the diameter $d_2$. On the opposing end of the head 7, it has a conical expansion to a diameter $d_3$. In other words, the traction shaft 5 thus has the diameter $d_1$ on the one end and the diameter $d_3$ on the opposite end.

The flow-formed rivet sleeve 1 corresponds to a flow-formed rivet sleeve (EFFN) that can be accessed from one side. The flow-formed rivet sleeve 1, in which the traction shaft 5 is presently or has been inserted, such that the traction shaft 5 is partially received in the flow-formed rivet sleeve 1, abuts on a contact region 20 of the traction shaft 5 thereon. The contact region 20 here corresponds to the region of the base body 6 on which a diameter transition from diameter $d_1$ to diameter $d_2$ takes place. In other words, the contact region 20 corresponds to the region of the base body 6 on which the conical expansion from diameter $d_1$ to diameter $d_2$ begins. The flow-formed rivet sleeve 1 thus therefore abuts on the contact region 20, since the inner diameter of the flow-formed rivet sleeve 1 on its first edge region 3 is only marginally greater than diameter dr, however is clearly smaller than diameter $d_2$.

FIGS. 1a and 1b also show two components 9 and 10, wherein the component 10 is facing towards the traction shaft 5 or the flow-formed rivet sleeve 1 and, correspondingly, is arranged between the component 9 and the traction shaft 5. The components 9 and 10 attach directly to each other and each have through openings 11 and 12 that align with one another. The through opening 11 is arranged on the one component 9, and the through opening 12 is arranged on the other component 10. In other words, the components 9 and 10 overlap at least in one respective overlapping region, wherein the through opening 11 is arranged in the overlapping region of one component 9 and the through opening 12 is arranged in the overlapping region of the other component 10. Here, the components 9 and 10 overlap in the overlapping regions in such a way that the through openings 11 and 12 at least partially mutually overlap, wherein the through openings 11 and 12 are presently at least substantially align with each other.

Figure 2A:
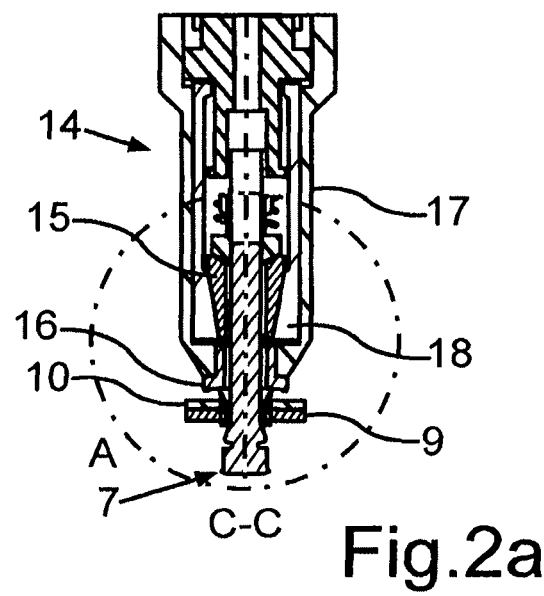
FIG. 2a is a schematic sectional view of the flow-formed rivet sleeve and the traction shaft along a sectional line C-C shown in FIG. 2b, wherein the traction shaft is presently received by a reshaping tool according to a first embodiment and is inserted, together with the flow-formed rivet sleeve, into respective through openings of the respective components to be joined.
Figure 2B:
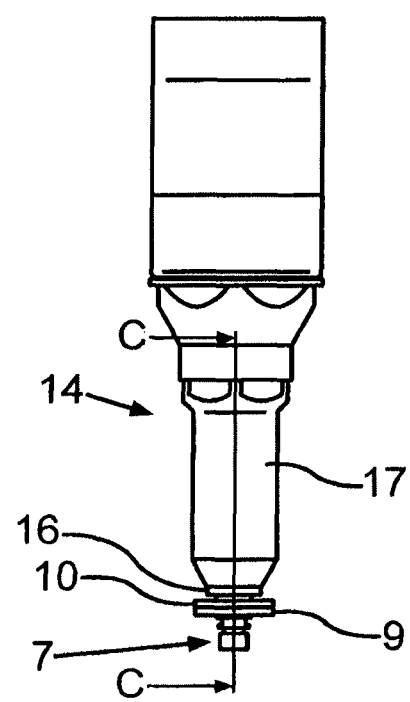
FIG. 2b is a schematic side view of the traction shaft receiving the flow-formed rivet sleeve, the traction shaft presently being received by the reshaping tool and being inserted into the through openings of the components together with the flow-formed rivet sleeve.
Figure 2C:
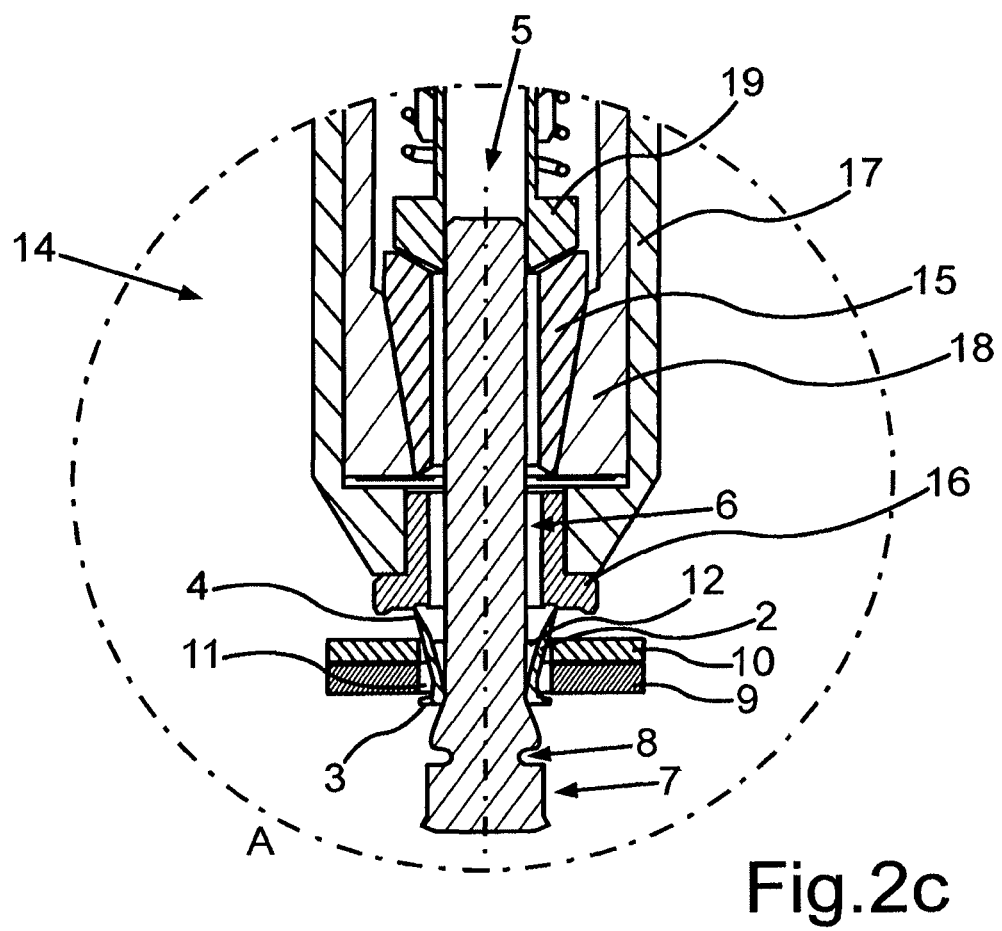

FIG. 2a shows a sectional view according to a sectional line C-C depicted in FIG. 2b, wherein both a reshaping tool 14 according to a first embodiment and the joining element according to the first embodiment, i.e., the traction shaft 5 and the flow-formed rivet sleeve 1 according to the respective first embodiment are depicted. Furthermore, the components 9 and 10 are depicted in FIG. 2a. FIG. 2c shows an enlarged detailed view of a region A that is circularly surrounded in the sectional depiction in FIG. 3a. In FIGS. 2a to 2c, the insertion of the flow-formed rivet sleeve 1 and the reception of the traction shaft 5 in the reshaping tool 14, which is also called the setting device, are shown. The reshaping tool 14 is pushed onto the traction shaft 5 until a closing head adapter 16 of the reshaping tool 14 comes to rest on the second edge region 4 of the flow-formed rivet sleeve 1 (EFFN) and is positioned there securely. Along with or in addition to the closed head adapter 16, the reshaping tool 14 also has respective claws 15, a traction adapter 18 and a conical tensioning element 19. The conical tensioning element 19, the claws 15 and the traction adapter 18 are received in a housing 17 of the reshaping tool 14. The closed head adapter 16 is also received by the housing 17, however protrudes from the housing 17 at its end that is in contact with the second edge region 4 of the flow-formed rivet sleeve 1. The flow-formed rivet sleeve 1 (EEFN) fixed on the reshaping tool 14, whose second edge region 4 is applied to the closed head adapter 16, is now inserted into the pre-punched stack of sheets, i.e., into the through openings 11 and 12 of the respective components 9 and 10 that align with each other. This insertion takes place, for example, in a joining direction that coincides with the axial direction of the traction shaft 5, the joining direction pointing in the direction of one component 9 from the other component 10 and running, for example, at least substantially perpendicular to the components 9 and 10.

Figure 3A:
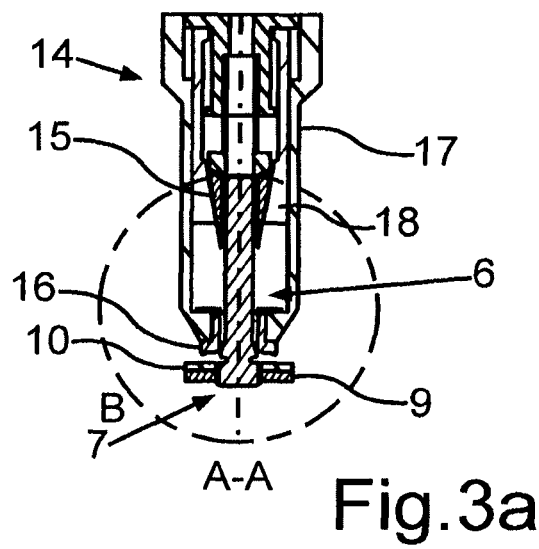
FIG. 3a is a schematic sectional view of the traction shaft moved relative to the flow-formed rivet sleeve by means of the reshaping tool along a sectional line A-A shown in FIG. 3b, wherein, as a result of the relative movement between the traction shaft and the flow-formed rivet sleeve, a first edge region of the flow-formed rivet sleeve is expanded and brought into contact with one of the components.
Figure 3B:
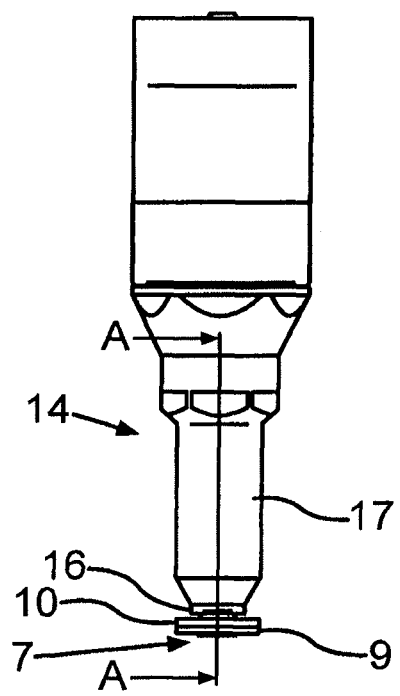
FIG. 3b is a schematic side view of the reshaping tool, by means of which a relative movement between the traction shaft and the flow-formed rivet sleeve is caused or takes place, wherein the first edge region of the flow-formed rivet sleeve is expanded and brought into contact with the one component.
Figure 3C:
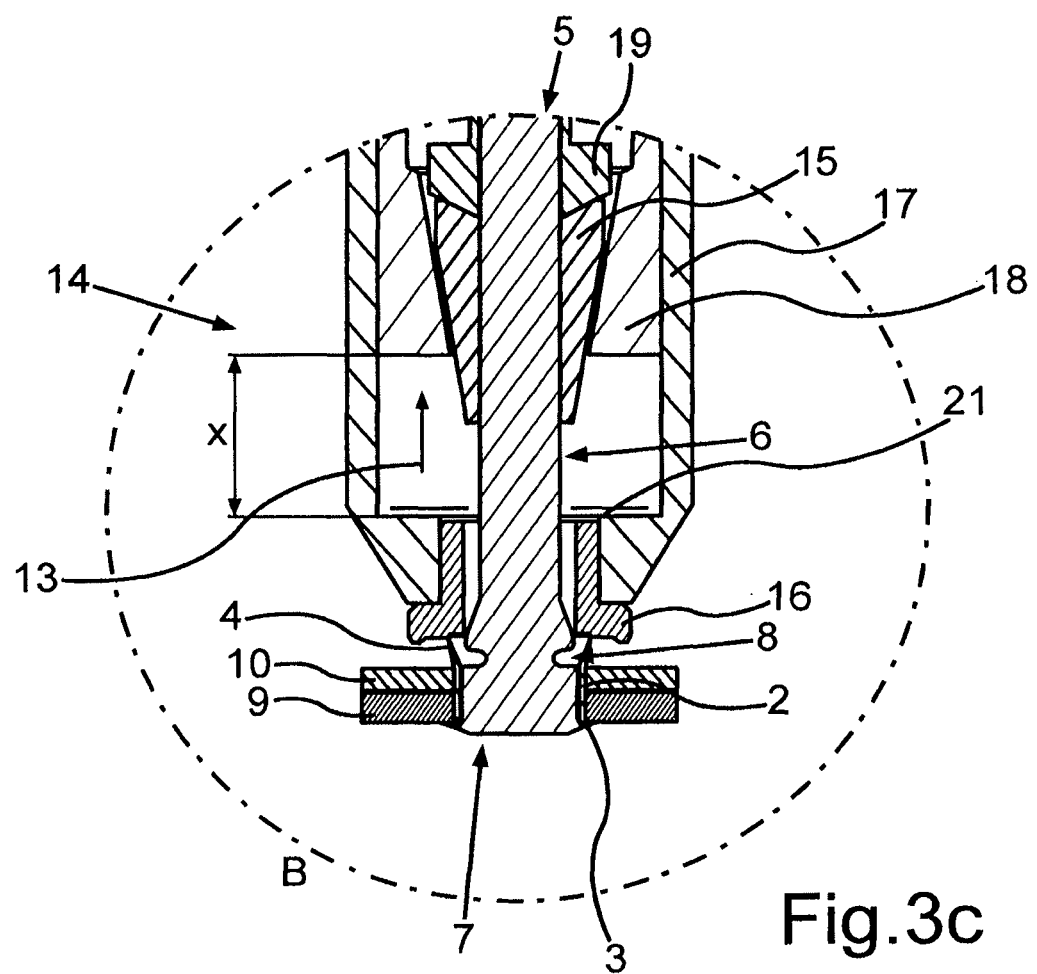

FIGS. 3a to 3c show first steps of a reshaping process of the flow-formed rivet sleeve 1 by means of the reshaping tool 14 (placing device). FIG. 3a here shows a sectional view according to a sectional line A-A depicted in FIG. 3b, wherein the reshaping tool 14 and the traction shaft 5, the flow-formed rivet sleeve 1 as well as the components 9 and 10 are depicted. FIG. 3c shows an enlarged partial view of a region B that is circularly surrounded in the sectional depiction in FIG. 3a.

When operating the reshaping tool 14, the traction adapter 18 is now removed from the housing surface 21 until an upstroke x is set between the housing surface 21 and the traction adapter 18. The conical tensioning element 19 is operated by spring force and, when the traction adapter 18 is spaced apart from the housing surface 21, the conical tensioning element 19 generates a force acting against the direction of a relative movement 13 labelled with an arrow. The arrow shown in FIG. 3c and illustrating the relative movement 13 further illustrates a direction or a traction direction in which the traction shaft 5 moves by means of the reshaping tool 14 relative to the flow-formed rivet sleeve 1, in particular moves in a translational manner, and is presently drawn. This direction or traction direction is here opposite to the joining direction mentioned previously. This means that the relative movement between the flow-formed rivet sleeve 1 and the traction shaft 5 is caused or induced by means of the reshaping tool 14.

The claws 15 are presently in contact with the traction adapter 18 via a respectively conical contour. As a result of the spring force, which acts on the claws 15 by means of the conical tensioning element 19, the claws 15 slip on the conical surface of the traction adapter 18 until the claws 15 engage around the traction shaft 5 on its cylindrical base body 6 and here clamp this in a force and form-fit manner. Thus, firstly the traction shaft 5 is enclosed in the reshaping tool 14 in a force and form-fit manner and is then spaced apart from the flow-formed rivet sleeve 1 together with the traction adapter 18 corresponding to the relative movement 13, until firstly an upstroke x is set between the traction adapter 18 and the housing surface 21.

The relative movement 13 between the traction shaft 5 and the flow-formed rivet sleeve 1 thus takes place, in other words, by the flow-formed rivet sleeve 1 being supported on the housing 17 of the reshaping tool 14 on its second edge region 4 by means of the closing head adapter 16, while the traction adapter 18 and with this the traction shaft 5 are moved correspondingly to the relative movement 13. As can be seen, in particular by means of FIG. 3c, the head 7 is drawn into the flow-formed rivet sleeve 1 by means of the relative movement 13 and thus by means of setting the upstroke x, and the flow-formed rivet sleeve 1 is pressed on the through openings 11 and 12 in a cylindrical manner. In other words, i.e., in terms of the relative movement 13, the diameter of the first edge region 3 is increased by the flow-formed rivet sleeve 1 being expanded to diameter $d_2$, based on the contact region 20, i.e., on diameter $d_1$.

Here, the cladding region 2 of the flow-formed rivet sleeve 1, the cladding region 2 being deformed to be conical in the base state, is deformed as a result of the relative movement 13 until the cladding region 2 abuts on the respective through openings 11 and 12 of the components 9 and 10 and is from then on correspondingly formed to by cylindrical. In other words, the cladding region 2 is thus firstly formed as a cone and is deformed as a result of the relative movement 13 to form a cylinder. The first edge region 3 is expanded by the relative movement 13 and is brought into contact with one component 9. The first edge region 3 here protrudes from the through opening 11 and, from then on, has a greater diameter than the through opening 11. The expanded first edge region 3 is thus expanded and is brought into contact with the component 9. A so-called setting head is here formed from the first edge region 3 or the first edge region 3 is reshaped by means of expanding into a so-called setting head. The first edge region 3 that is expanded and thus reshaped to form the setting head forms a so-called secondary head, for example, together with the head 7 of the traction shaft 5. When reshaping the flow-formed rivet sleeve 1, it is noticeable that virtually during the whole reshaping process, i.e., during the reshaping of the two edge regions 3 and 4 and the cladding region 2, no or at least a very small force effect takes place on the components 9 and 10, since the force fit of the reshaping deformation force takes place extensively inside the flow-formed rivet sleeve 1. It is obviously clear that no more than one force acts on the components 9 and 10 when the two edge regions 3 and 4 or the cladding region 2 are brought into contact with the components 9 and 10.

Figure 4A:
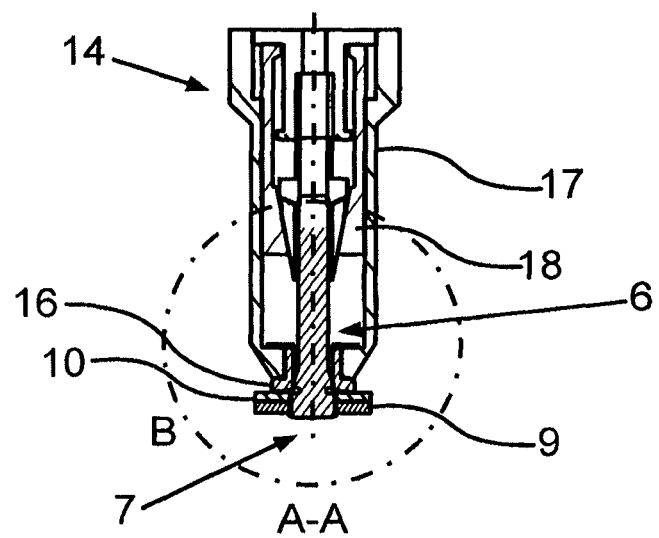
FIG. 4a is a schematic sectional view of the traction shaft and the flow-formed rivet sleeve along a sectional line A-A shown in FIG. 4b, wherein the flow-formed rivet sleeve is bent towards the other component as a result of the relative movement between the traction shaft and the flow-formed rivet sleeve on the second edge region brought about by the reshaping tool and brought into contact with the other component.
Figure 4B:
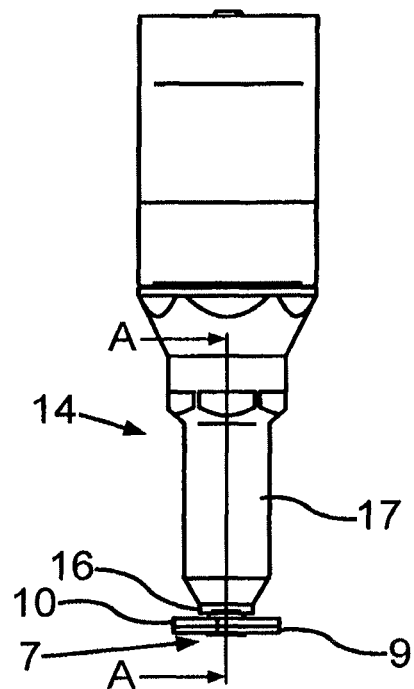
FIG. 4b is a schematic side view of the flow-formed rivet sleeve reshaped by means of the reshaping tool on its edge region.
Figure 4C:
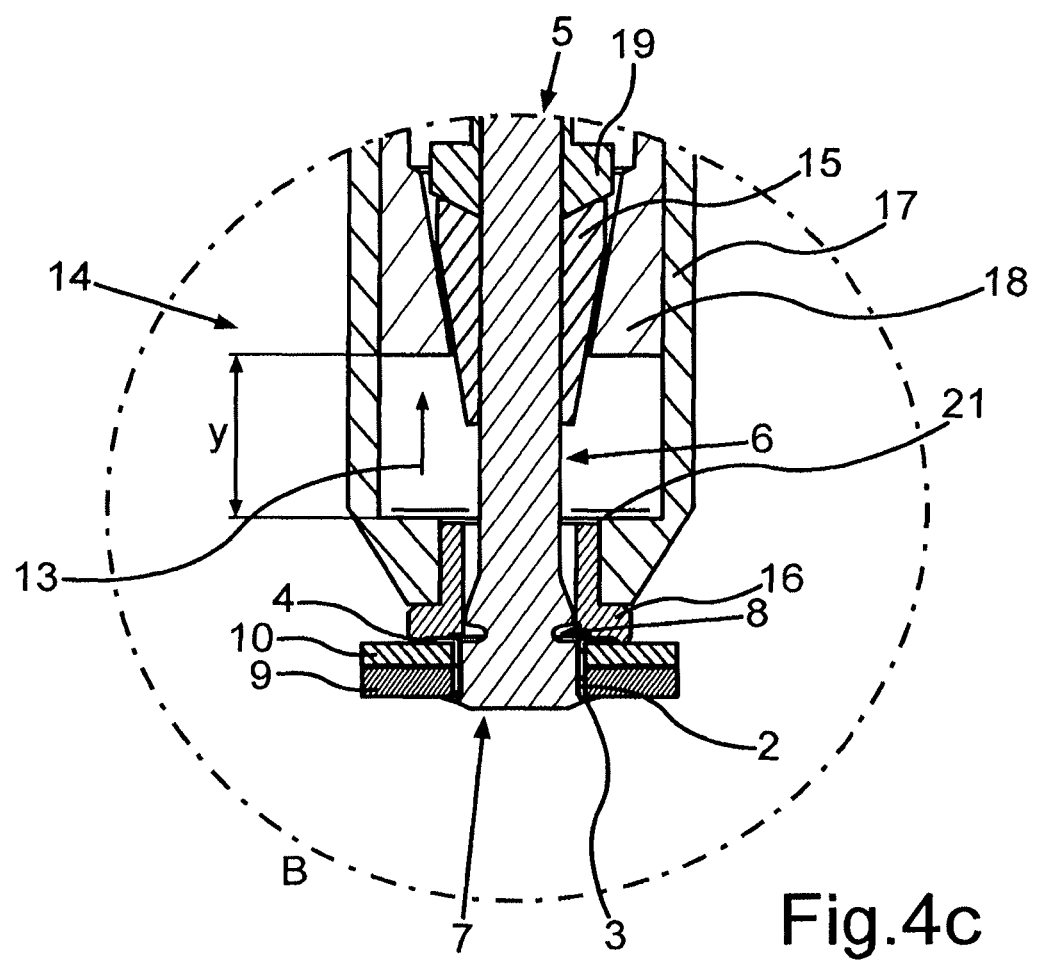

FIGS. 4a to 4c show a further step of the reshaping process of the flow-formed rivet sleeve 1 by means of the reshaping tool 14, wherein, as a result of the relative movement 13, the upstroke x, i.e., the distance between the traction adapter 18 and the housing surface 21, was, from then on, increased to an upstroke y. When setting the upstroke y, here the second edge region 4 is bent towards the other component 10 by means of the reshaping tool 14, i.e., is plastically deformed and thus brought into contact with the other component 10. Just as the first edge region 3 protrudes, the second edge region 4 also protrudes beyond the corresponding through opening 12 and correspondingly—as a result of the reshaping—has a greater diameter than the through opening 12. The second edge region 4 is here reshaped to form a so-called closing head or a so-called closing head is formed from the second edge region 4 by the second edge region 4 being bent, brought into contact with the other component 10 and thus reshaped.

Figure 5A:
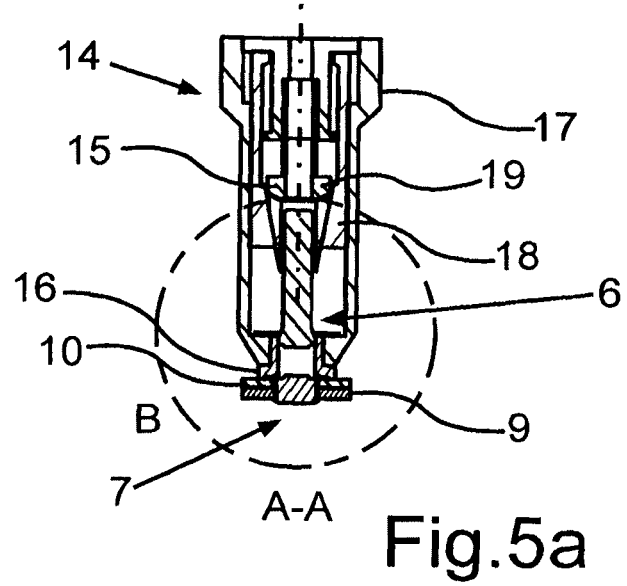
FIG. 5a is a schematic sectional view of the traction shaft along a sectional line A-A depicted in FIG. 5b, wherein, in the case of the traction shaft, a base body of the traction shaft has been separated from a head of the traction shaft at a predetermined breaking point as a result of the relative movement between the flow-formed rivet sleeve and the traction shaft.
Figure 5B:
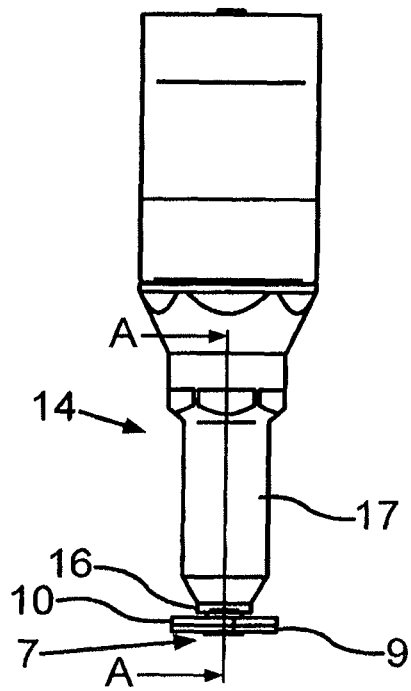
FIG. 5b shows a schematic side view of the reshaping tool and the head of the traction shaft separated from the base body and the flow-formed rivet sleeve joining the respective components.
Figure 5C:
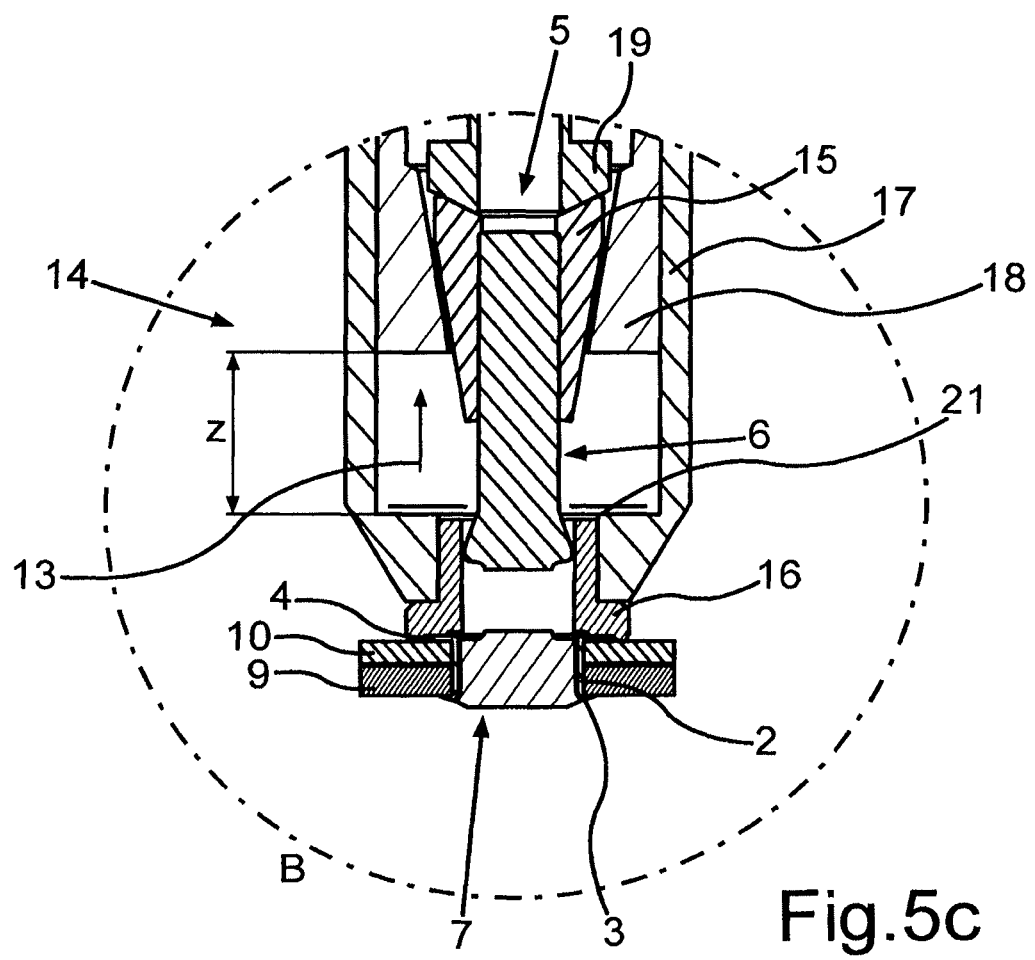

FIGS. 5a to 5c show the last phase of the deformation process, wherein, from then on, as a result of the relative movement 13, the upstroke y is increased to an upstroke z. The force of the traction adapter 18 here increases so much that the maximally permissible traction tension in the traction shaft 5 is exceeded and here the head 7 is separated from the base body 6 at the predetermined breaking point 8. In other words, the traction shaft 5 thus rips off at the predetermined breaking point 8. At the same time, as a result of the further force increase, the material of the flow-formed rivet sleeve 1 is plastically deformed to the extent that a sufficient strain hardening is obtained as a result of the corresponding joint-placement ratio.

Figure 6A:
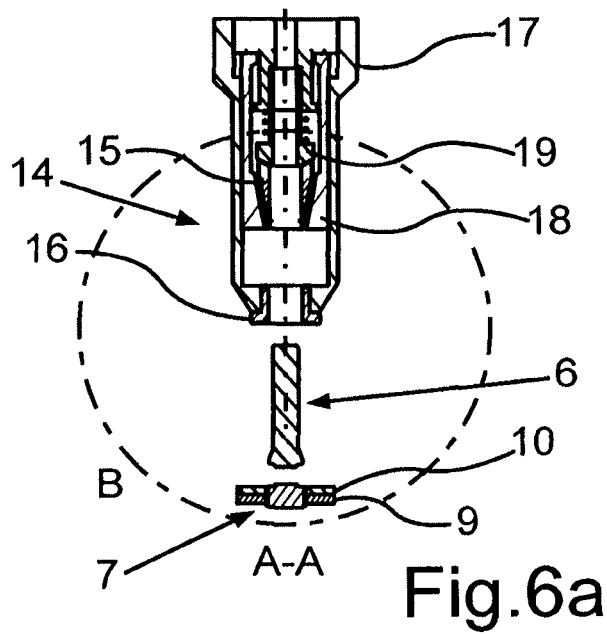
FIG. 6a is a schematic sectional view of the flow-formed rivet sleeve along a sectional line A-A shown in FIG. 6b, wherein the flow-formed rivet sleeve is fixed to the respective components and the head of the traction shaft is received at least partially in the flow-formed rivet sleeve.
Figure 6B:
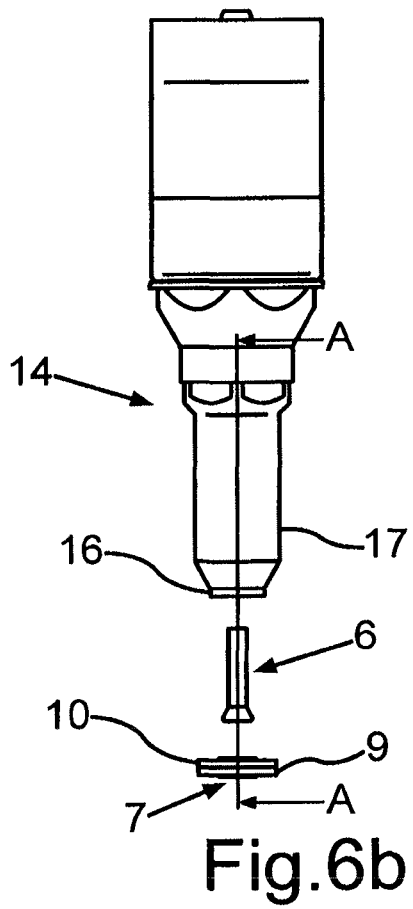
FIG. 6b is a schematic side view of the base body of the traction shaft separated from the head, the traction shaft having been removed from the deformation tool.
Figure 6C:
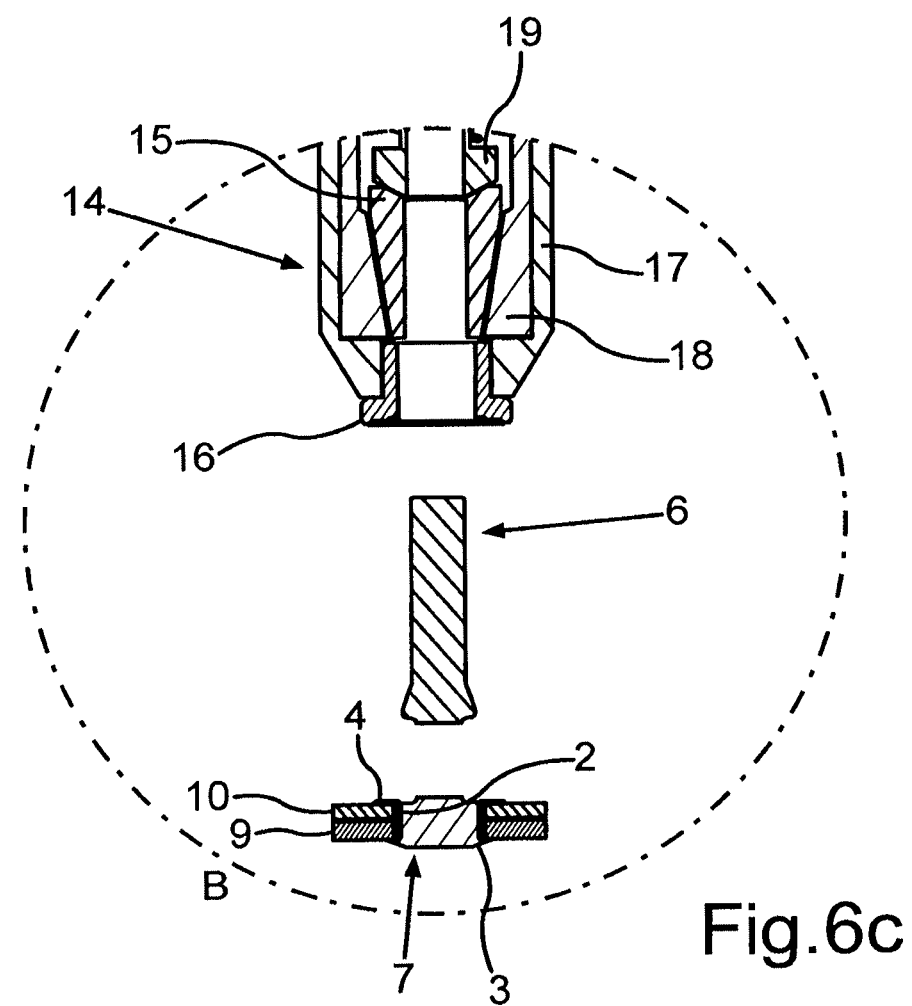

It is shown in FIGS. 6a to 6c how the base body 6 separated from the head 7 is removed from the reshaping tool 14, wherein the reshaping tool 14 is from then on ready to receive the next flow-formed rivet sleeve 1 or the next traction shaft 5 again. As can be seen in FIG. 6c in particular, the base body 6 can be removed from the reshaping tool 14 by the upstroke between the traction adapter 18 and the housing surface 21 being decreased once again. The head 7 of the traction shaft 5 presently remains at least partially, in particular at least extensively or completely, in the reshaped flow-formed rivet sleeve 1. However, it is clear that the head 7 could also be removed again from the flow-formed rivet sleeve 1.

Figure 7:
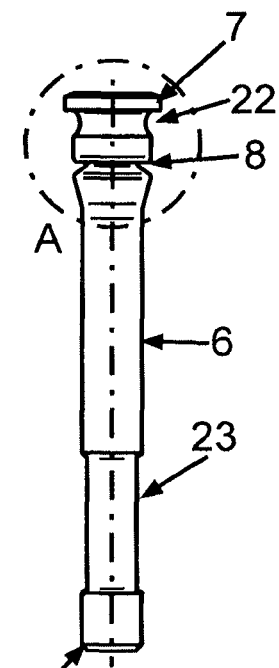
FIG. 7 is a schematic side view of the traction shaft according to a second embodiment.
Figure 8:
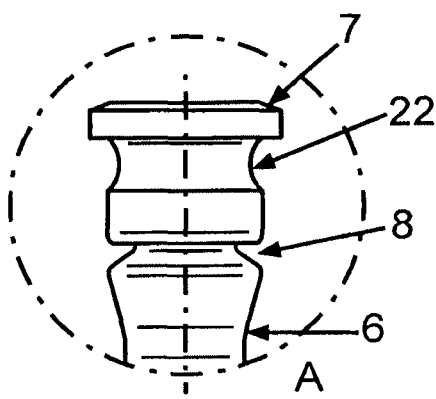
FIG. 8 is a schematic detailed view of a region A shown in FIG. 7.

A second embodiment of the joining element and a second embodiment of the reshaping tool 14 are illustrated by means of FIGS. 7 to 15. FIG. 7 shows the traction shaft 5 of the joining element according to the second embodiment. Here, FIG. 8 shows a region A shown in FIG. 7 in an enlarged depiction. As can be seen particularly well in FIGS. 7 and 8, the head 7 of the traction shaft 5 has a recess 22 which receives material which is displaced during joining. It can be seen in FIG. 7 that the recess 22 is a recess that is different to the predetermined breaking point 8. This emerges by the predetermined breaking point 8 being arranged in the axial direction of the traction shaft 5 between the base body 6 and the head 7, wherein the recess 22 is provided on the head 7. In other words, when joining the components 9 and 10, a material displacement takes place, in the course of which material, for example, at least of one of the components 9 and 10 and/or material of the flow-formed rivet sleeve 1 is displaced. This displaced material can at least partially reach the recess 22, in particular flow into it, such that then, for example, the material that has reached the recess and is displaced engages with the head 7 in a form-fit manner. As a result of this form-fit engagement, the head 7, which is separated from the base body 6 as part of the joining, is held securely on and in the flow-formed rivet sleeve 1 and thus is secured particularly effectively against detachment. This means that the danger of the head 7 undesirably detaching from the flow-formed rivet sleeve 1 and the components 9 and 10 can thus be kept particularly minimal.

It can be seen particularly well in FIGS. 7 and 8 that the recess 22 presently extends completely continuously in the peripheral direction of the head 7. This means that the recess 22 runs completely in the peripheral direction of the head 7, i.e., it runs without interruption around the head 7, such that the recess 22 is formed, for example, to be circular or as a closed circle. Furthermore, the recess 22 is presently formed groove-like or groove-shaped, in particular as a groove. The recess 22 can thus receive a particularly large amount of displaced material. In particular, it is possible that the displaced material at least extensively or completely continuously surrounds the head 7 in its peripheral direction, such that the head 7 is held in a particularly secure manner on the flow-formed rivet sleeve 1 and the components 9 and 10.

Figure 9:
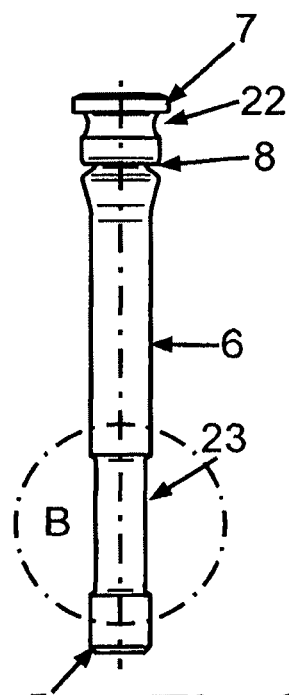
FIG. 9 is a further schematic side view of the traction shaft according to the second embodiment.
Figure 10:
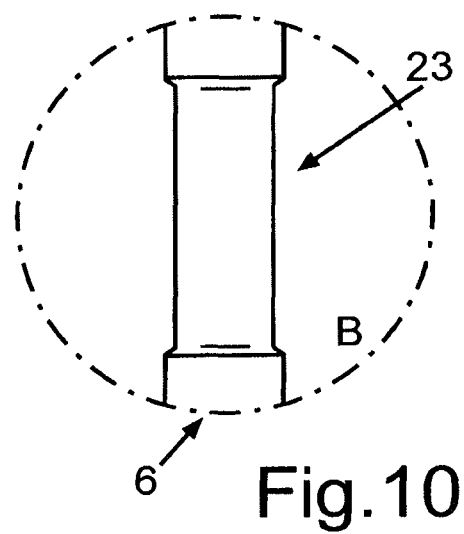
FIG. 10 is a schematic detailed view of a region B shown in FIG. 9.

FIG. 9 shows the traction shaft 5 according to the second embodiment in a further schematic side view, wherein, in FIG. 10, a region B from FIG. 9 is depicted in an enlarged manner. It can be seen from FIGS. 9 and 10 that the base body 6 of the traction shaft 5 has at least one form-fit element 23, via which the reshaping tool 14, by means of which the relative movement of the traction shaft 5 to the flow-formed rivet sleeve 1 is caused, engages with the traction shaft 5 in a form-fit manner at least when causing the relative movement. In other words, the deformation tool can be brought into form-fit engagement with the traction shaft 5 via the form-fit element 23 when causing the relative movement. Here, the form-fit element 23 is a form-fit element 23 that is different to the predetermined breaking point 8 and also different to the recess 22, since the predetermined breaking point 8 is arranged in the axial direction of the traction shaft 5 between the base body 6 and the head 7, the recess 22 is arranged on the head 7 and the form-fit element 23 on the base body 6, however.

It can be seen particularly well in FIGS. 9 and 10 that the form-fit element 23 is presently formed as a receiver, in which at least one further corresponding form-fit element of the reshaping tool 14 can be at least partially received. The receiver here extends completely continuously in the peripheral direction of the base body 6, such that the receiver is formed as a circle that is completely continuous in the peripheral direction of the base body 6, closed and unbroken. Presently, the form-fit element 23 or the receiver is formed as a completely continuous or unbroken and closed groove, which ensures a transfer of particularly high traction forces between the reshaping tool 14 and the traction shaft 5.

In the present case, the reshaping tool 14 has a plurality of further form-fit elements in the shape of claws 15, which engage with the traction shaft 5 in a form-fit manner at least when causing the relative movement between the traction shaft 5 and the flow-formed rivet sleeve 1 via the form-fit element 23. To this end, the respective claws 15 are received at least partially in the receiver (form-fit element 23) or engage with the receiver (form-fit element 23). Thus, the claws 15 and the corresponding receiver produce a form-fit geometry by means of which high traction forces can also be transferred. The claws 15 are also called gripping claws and can be designed to be in two or more parts. For the form-fit engagement, the claws 15 are brought into supporting abutment, for example, with respective walls of the base body 6 which at least partially border the receiver, such that forces can be transferred, for example, between the claws 15 and these walls.

Figure 11:
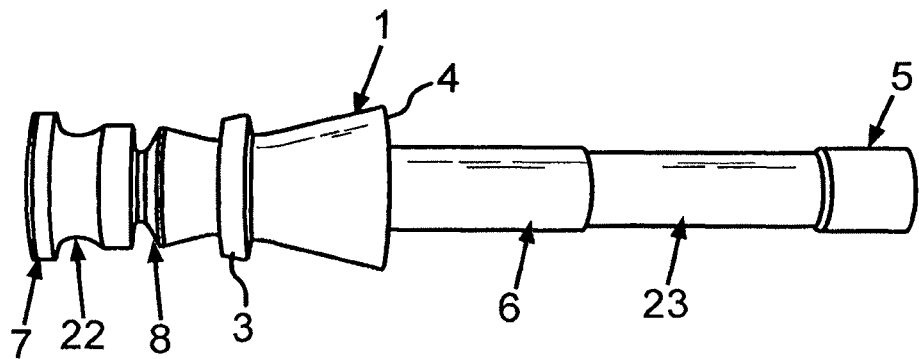
FIG. 11 is a schematic top view of a joining element, which comprises the flow-formed rivet sleeve and the traction shaft inserted into the flow-formed rivet sleeve and thus partially received in the flow-formed rivet sleeve according to a second embodiment.

FIG. 11 shows the joining element comprising the traction shaft 5 and the flow-formed rivet sleeve 1 in a schematic top view, wherein a longitudinal region of the traction shaft 5 is received in the flow-formed rivet sleeve 1, since the traction shaft 5 is pushed into the flow-formed rivet sleeve 1. The first edge region 3 of the flow-formed rivet sleeve 1 includes a radially outwardly extending collar which extends axially beyond the first component. The opposite second edge region includes a frustoconical portion which extends axially outwardly beyond the second component, having a diameter which widens with increasing distance from the first edge region.

Figure 12:
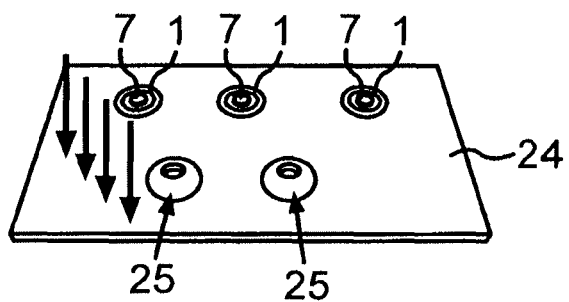
FIG. 12 is a schematic and perspective top view of a component to which flow-formed rivet sleeves and conventional rivets are fixed.
Figure 13:
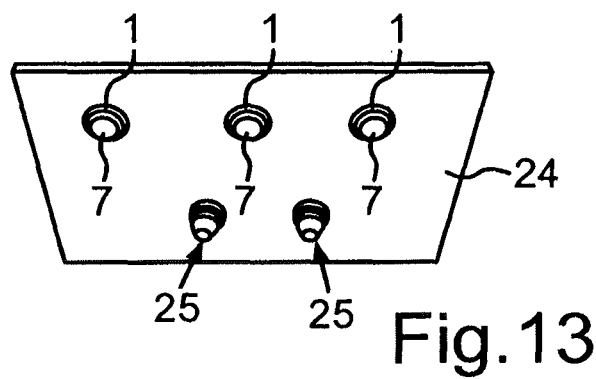
FIG. 13 is a schematic and perspective bottom view of a according to FIG. 12.

FIG. 12 shows a component 24 in a schematic and perspective top view, on which component 24 flow-formed rivet sleeves 1 and the heads 7 separated from the respective base bodies 6 are fixed. Furthermore, traditional rivets 25 are provided on the component 24. FIG. 12 shows a first side of the component 24, wherein FIG. 13 shows a second side of the component 24 that is facing away from the first side of the component 24. It can be seen particularly well in FIGS. 12 and 13 that the respective flow-formed rivet sleeve 1 and the head 7 have a substantially smaller length that runs in the axial direction and thus occupy a substantially smaller construction space than the traditional rivets 25. In other words, the flow-formed rivet sleeves 1 project substantially less far from the component 24 both on the first side and on the second side of the component 24 than the traditional rivets 25. As a result, the components 9 and 10 can be connected to one another not only in a strong, in particular high-strength manner, but also in a way that saves space in particular.

Figure 14:
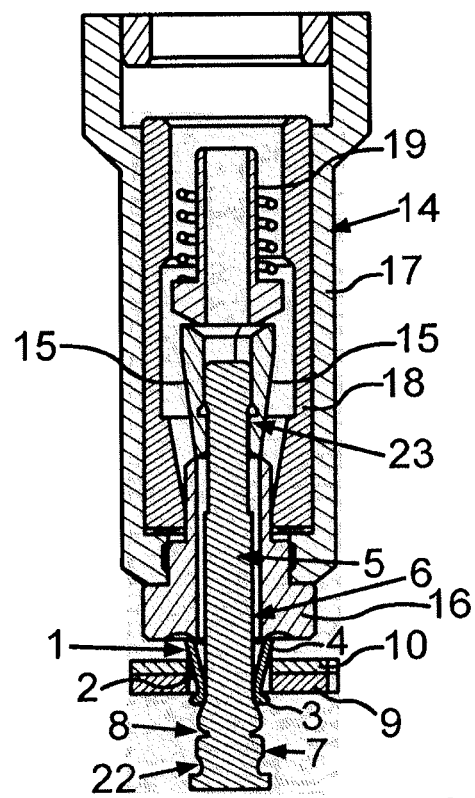
FIG. 14 is a schematic sectional view through the joining element and the reshaping tool according to the respective second embodiment.
Figure 15:
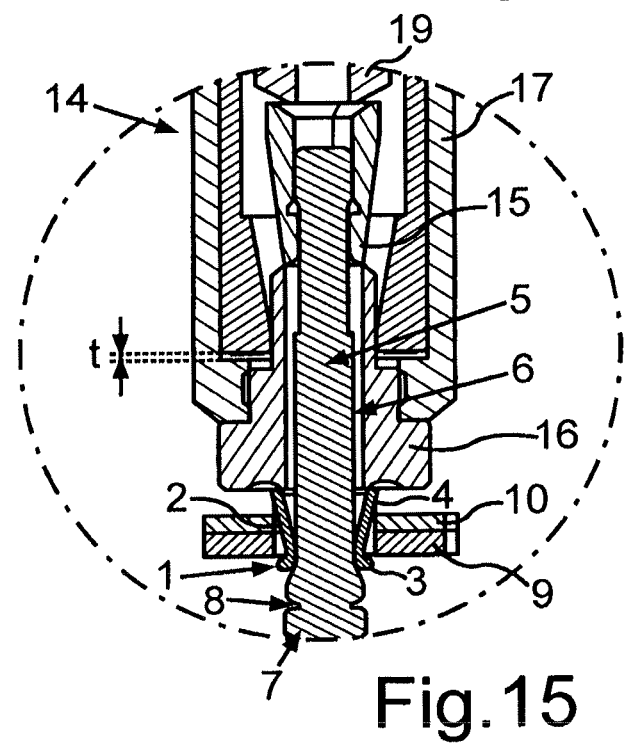
FIG. 15 shows sectionally, a further schematic sectional view through the joining element and the reshaping tool according to the respective second embodiment.

FIGS. 14 and 15 show the form-fit engagement of the reshaping tool 14 with the traction shaft 5, in particular the base body 6, particularly well. It can be seen in FIGS. 14 and 15 that the claws 15 engage with the corresponding form-fit element 23 that is formed as a receiver, such that particularly high forces, in particular traction forces, can be transferred in a form-fit manner between the reshaping tool 14 and the traction shaft 5, in particular from the reshaping tool 14 to the traction shaft 5. Overall, it is thus possible to join the components 9 and 10 in a form-fit manner with access only on one side in an optimal manner in terms of construction space and strength. Furthermore, a distance t between the traction adapter 18 and the housing 17 is illustrated in FIG. 15, wherein the distance t is not an upstroke or the traction adapter 18 is not implemented as an upstroke by the distance t.

The invention claimed is:

1. A method for joining a first component to a second component, comprising:
   providing a flow-formed rivet sleeve, the rivet sleeve comprising
      a cladding region arranged between
      a first edge region having a radially outwardly extending collar and
      a second edge region having a diameter which widens with increasing distance from the first edge region;
   providing a traction shaft, the traction shaft comprising
      a base body,
      a head, and
      a predetermined breaking point disposed between the head and the base body;
   inserting the flow-formed rivet sleeve and the traction shaft into respective through openings of the first component and the second component that at least substantially align with one another;
   forming a setting head by widening the radially outwardly extending collar and bringing the first edge region into contact with the first component by moving the traction shaft relative to the flow-formed rivet sleeve; and
   forming a closing head by bending the second edge region towards the second component by a reshaping tool that surrounds the traction shaft and brings the second edge region into contact with the second component,
   wherein the head of the traction shaft has a recess, and
   wherein the recess receives displaced material of the flow-formed rivet sleeve during the joining.

2. The method according to claim 1, wherein the first component and the second component are sheet components of a vehicle body.

3. The method according to claim 1, wherein the base body has a form-fit element and wherein the reshaping tool engages with the form-fit element.

4. The method according to claim 1, wherein the cladding region is initially formed conically and is cylindrically deformed as a result of moving the traction shaft.

5. The method according to claim 1, wherein the recess is arranged within the through openings of the first component and the second component.

6. The method according to claim 1, wherein forming the setting head is effected without forming a fold.

7. The method according to claim 1, wherein the recess has a concave shape.

8. The method according to claim 1, wherein the setting head has a height of 3 millimeters or less.

9. The method according to claim 1, wherein the closing head has a height of 1 millimeter or less.

* * * * *